(No Model.)
A. PLATKY & E. FINSTERER.
NECKTIE AND COLLAR FASTENER.
No. 259,583. Patented June 13, 1882.
Fig. 1.
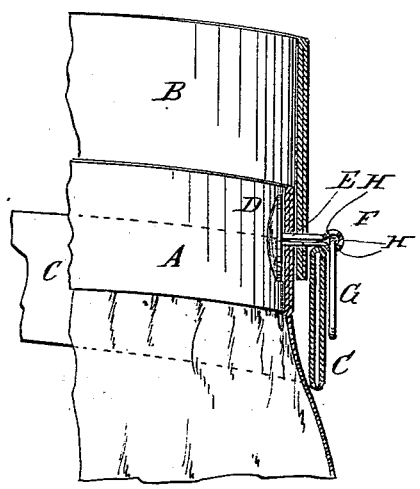
Fig. 2.
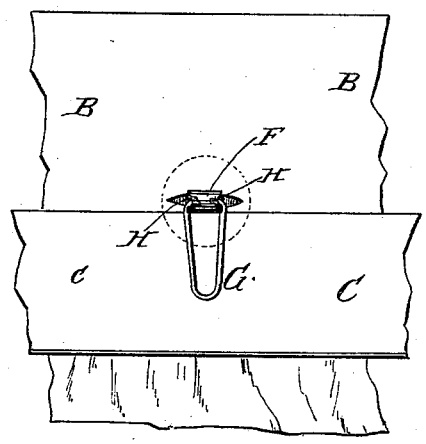
Fig. 3.
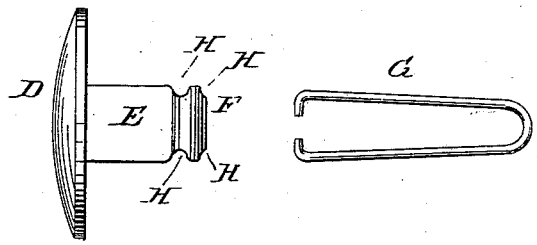
Fig. 4.
Fig. 5.
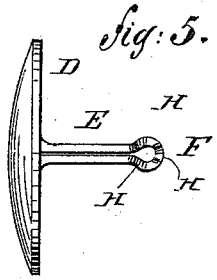
WITNESSES:
Chas. Nida
C. Sedgwick
INVENTOR:
A. Platky
E. Finsterer
BY Munn & Co.
ATTORNEYS.

UNITED STATES PATENT OFFICE.

ADOLPH PLATKY AND EMANUEL FINSTERER, OF NEW YORK, N. Y.

NECKTIE AND COLLAR FASTENER.

SPECIFICATION forming part of Letters Patent No. 259,583, dated June 13, 1882.

Application filed April 21, 1882. (No model.)

*To all whom it may concern:*

Be it known that we, ADOLPH PLATKY and EMANUEL FINSTERER, both of the city, county, and State of New York, have invented a new and useful Improvement in Necktie and Collar Fasteners, of which the following is a full, clear, and exact description.

Reference is to be had to the accompanying drawings, forming a part of this specification, in which similar letters of reference indicate corresponding parts in all the figures.

Figure 1 is a side elevation of our improvement, illustrating its use, the neckband, collar, and necktie being shown in section. Fig. 2 is a rear elevation of the same. Fig. 3 is a plan view of the head and shank of the fastener. Fig. 4 is a plan view of the link. Fig. 5 is a side elevation of the head and shank of the fastener.

The object of this invention is to provide fasteners for securing the rear parts of collars to shirt-neckbands, constructed in such a manner that they will serve also to secure neckties in place and prevent them from slipping upward.

The invention consists in a necktie and collar fastener constructed with a head provided with a flat shank, having an eye at its end to receive an open spring-link, the said link being kept in place by notches formed in the ends of the shank-eye, as will be hereinafter fully described.

A represents the neckband of a shirt, B a collar, and C a necktie, all of which are constructed in the ordinary manner.

D is a head, which is made and applied to its shank E in the manner of an ordinary button-head. The shank E may be made flat, and has an eye, F, formed in its outer end. The eye F can be formed by making the shank E of a thin strip of sheet metal folded together at the center; or the eye can be formed by boring the end of a thick shank, or in any other convenient manner.

G is the link, which we prefer to make slightly tapered, and which is open at one end. The link is made by bending a piece of wire of suitable length into U shape, and then bending the ends of the wire at right angles and toward each other, as shown in Fig. 4. The open end of the link G is then sprung into the ends of the eye F, as shown in Figs. 1 and 2.

In each end of the eye F are formed three notches, H, one in the plane of the shank E and the others at right angles or nearly at right angles with the said plane, as shown in Figs. 3 and 5. With this construction, when the link G is turned into line with the plane of the shank E, or at right angles therewith, the elasticity of the wire will hold the said link in the notches of the eye F, and thus keep it in place.

In using the fastener the link G is turned into line with the shank E, and the link and shank are then passed through the button-holes in the back of the neckband A and of the collar B. The necktie C is then passed around below the shank F and link G, and the link G is turned downward into the lower notches, H, so as to extend along the rear side of the necktie C, as shown in Figs. 1 and 2, and confine the said necktie in place and prevent it from slipping upward.

Having thus described our invention, we claim as new and desire to secure by Letters Patent—

In a necktie-fastener, the flat shank E, having a head, D, and an eye, F, with three notches, H, in combination with a U-shaped tapering and elastic link, G, open at one end, as shown and described.

ADOLPH PLATKY.
EMANUEL FINSTERER.

Witnesses:
C. SEDGWICK,
J. H. SCARBOROUGH.